United States Patent [19]
Schlecht et al.

[11] Patent Number: 5,605,174
[45] Date of Patent: Feb. 25, 1997

[54] DEVICE FOR CONVEYING THICK SUBSTANCES CONTAINING A GREAT DEAL OF SOLID MATERIAL

[75] Inventors: Karl Schlecht, Filderstadt; Axel Rockstroh, Bad Urach; Ulrich Schuster, Waldkraiburg, all of Germany

[73] Assignee: Putzmeister-Werk Maschinenfabrik GmbH, Aichtal, Germany

[21] Appl. No.: 313,292

[22] PCT Filed: Feb. 4, 1993

[86] PCT No.: PCT/EP93/00251
§ 371 Date: Dec. 27, 1994
§ 102(e) Date: Dec. 27, 1994

[87] PCT Pub. No.: WO93/20002
PCT Pub. Date: Oct. 14, 1993

[30] Foreign Application Priority Data

Apr. 3, 1992 [DE] Germany ............... 42 11 138.2

[51] Int. Cl.$^6$ ............................................. F17D 1/16
[52] U.S. Cl. ................... 137/13; 137/896; 251/148
[58] Field of Search ............... 137/13, 604; 251/148, 251/118

[56] References Cited

U.S. PATENT DOCUMENTS

| | | | |
|---|---|---|---|
| 2,821,205 | 1/1958 | Chilton et al. | 137/13 |
| 3,099,993 | 8/1963 | Smith | 137/13 |
| 3,414,004 | 12/1968 | Bankston | 137/13 |
| 3,892,252 | 7/1975 | Poettmann | 137/13 |
| 4,510,958 | 4/1985 | Coursen | 137/13 |
| 5,361,797 | 11/1994 | Crow et al. | 137/13 |

FOREIGN PATENT DOCUMENTS 3605723  8/1987  Germany.

*Primary Examiner*—A. Michael Chambers
*Attorney, Agent, or Firm*—Flynn, Thiel, Boutell & Tanis, P.C.

[57] ABSTRACT

The invention relates to a conveyor for thick substances containing a great deal of solids and having a conveyor pipe (20) which can be filled with the thick substances under pressure and at least one injection point (22, 24) opening into the conveyor pipe (20) to supply a lubricant (83) to the region (84) between the pipe wall and the surface of a plug flow of thick substance (82) being formed in the conveyor pipe (20). In order to center the plug flow (82) inside the conveyor pipe (20) and provide a stable layer of lubricant (83), the invention proposes that the conveyor pipe (20) have at least one annular waist at a distance from and downstream of the injection point (22, 24) formed by a collar or shoulder-like projection (62') inside the conveyor pipe (20). A bore (72) passing radially through the pipe wall for the connection of a lubricant injection line (76) may be provided in the flow shadow of the waist (62'), and at least one further waist (79) is provided downstream at a distance from the injection drilling (72).

18 Claims, 4 Drawing Sheets

DEVICE FOR CONVEYING THICK SUBSTANCES CONTAINING A GREAT DEAL OF SOLID MATERIAL

FIELD OF THE INVENTION

The invention relates to a device for the conveyance of thick substances rich in solid material with a conveyor pipe filled with the thick substances under pressure, and at least one injection place opening into the conveyor pipe for the introducing of a lubricant into the region between the pipe wall and the surface of a thick substance plug flow that is formed in the pipe.

BACKGROUND OF THE INVENTION

Pipelines are often used for the conveyance of solid/liquid mixtures having a high solid substance constituent, such as, for example settled sludge or mud. Such thick substances have a great internal friction, so that in their pressing through a conveyor pipe no speed gradient develops transversely to the direction of spreading. A relative movement takes place essentially only between the surface of the thick substance strand and the pipe wall, the sliding friction being reduced by the injected lubricant. In the conveyance of partially dehydrated settled sludge, it is already a known practice (DE-OS 36 05 723), for the reduction of the wall friction to inject at the beginning of the pipe line heating oil, water or an aqueous solution of a high-polymer lubricant between the settled sludge and the wall of the conveyance line. This occurs mostly continuously and proportionally to the conveyance flow in dosed amount with the consequence that between the pipe inner wall and the thick substance strand a boundary layer forms, by which the conveyance pressure can be reduced by 80% and more. However, especially in the case of relatively long conveyance stretches of several hundred meters there are still yielded very high conveyance pressures, since the sliding layer along the conveyance stretch gradually disappears.

SUMMARY OF THE INVENTION

This invention is the problem of improving the known conveyance device of the type mentioned above that along the pipe there is maintained a uniform lubricant layer with the least possible use of lubricant.

Underlying the invention is the insight that a low pressure decline in the conveyance line is achievable only if the thick substance plug flow is transported largely free of wall contact through the entire conveyance pipe. This is the case when a sufficiently thick lubricant layer can be maintained over the entire conveyance pipe. In order to achieve this, it is proposed according to the invention that the conveyance pipe have an annular cross section construction located downstream at a distance from the injection point. This cross section constriction has the function of a boundary layer barrier which provides that the lubricant is not dragged unnecessarily by the thick substance plug flow. Furthermore, at the cross section constriction there occurs a limitation of the thick substance plug flow to a correspondingly small diameter. Further, there is achieved thereby a centering of the thick substance plug flow inside the conveyance pipe, which leads to the result that the lubricant layer remains largely equally thick over the circumference. Advantageously the inside diameter of the conveyance pipe in the region of the cross section constriction is i mm preferably 2 to 3 mm smaller than outside this region.

A preferred embodiment of the invention provides that the cross section constriction is formed by a bulge or collar-type annular raised part, on the inside of the conveyance pipe, which can be generated, for example, by an annular weld bead protruding into the pipe interior or by a tapping or boring of the pipe. Optionally it is also possible to equip the most welded-on flange rings of the pipe line with a diameter reduced in comparison to the pipe interior diameter. This can be the case on one or on both flange halves. Further, the cross section constriction can be formed by a collar ring protruding into the pipe interior, preferably clamped between two pipe flanges.

In horizontal or diagonal conveyance pipes, because of the mostly higher specific gravity of the conveyance material in comparison to the lubricant, there occurs a displacement of the thick substance plug flow towards the direction of the underside of the wall, and thereby there are disturbances in the frictional behavior. It is expedient, therefore, to provide along the conveyance pipe several cross section constrictions at a spacing preferably of 2 to 6 meters from one another, which assure a sufficient centering even over relatively long conveyance stretches. For the same reason it is advantageous if on the downstream end of a pipe curve within which the thick substance plug flow is pressed in the direction of the outer radius, there is provided a cross section constriction again centering the plug flow. In order, moreover, to compensate for delay losses it has proved especially advantageous if downstream of the cross section constriction there is provided a preferably closable bore passing essentially radially through the pipe wall, for the connection of an injection line for lubricants, in which case there can be provided downstream at a distance from the bore at least one further cross section constriction. In the case of horizontally or diagonally oriented conveyance pipes, the bore is advantageously arranged in the under side of the pipe.

In the case of an abrasive conveyance material, the annular raised part is expediently made of a wearproof material, for example by application welding or the use of a hardened collar ring. The later is replaceable in the case of its wearing down.

To make possible a recovery of the lubricant at the end of the pipe, it is advantageous if in the vicinity of the conveyance pipe end there are arranged two cross section constrictions spaced from one another and in the spacing range there is arranged at least one drainage or draw-off bore for the lubricant passing through the pipe wall. The recovered lubricant can be led away for a cost-saving reuse.

BRIEF DESCRIPTION OF THE DRAWINGS

The invention is explained with the aid of the exemplary embodiments represented schematically in the drawings in which.

DETAILED DESCRIPTION

Figure 1:
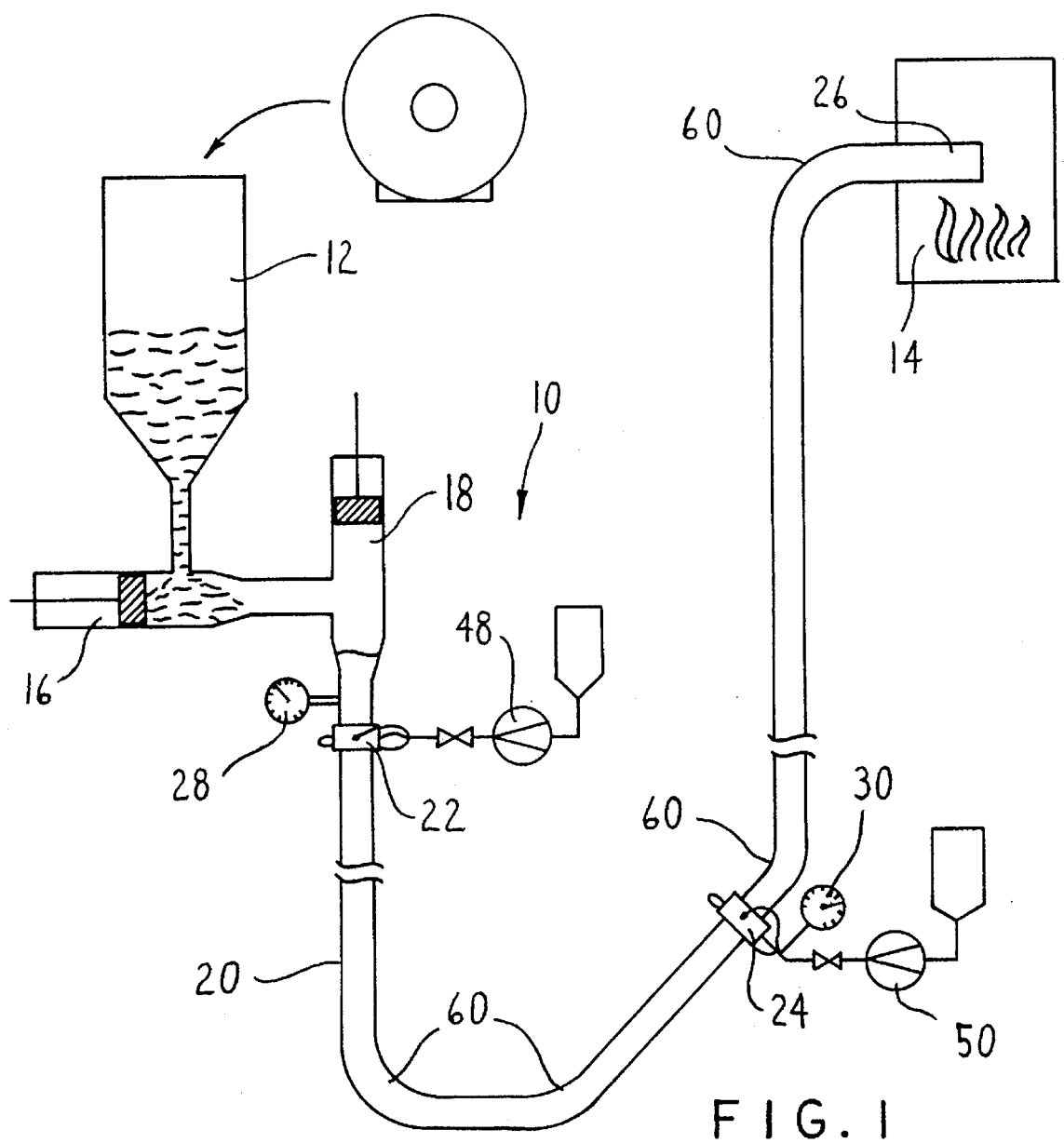
FIG. 1 shows a schematic representation of a thick substance conveyance installation.

The conveyance installation 10 schematically represented in FIG. 1 is intended for the conveyance of thick substances rich in solid substances, such as, for example, partially dehydrated settled sludge, which after intermediate storage in a sludge supply 12 is conveyed through a pipe line 20 for burning in a fluidized bed furnace 14. The conveyance installation 10 consists essentially of a compressor pump 16 supplied with the partially dehydrated settled sludge, a conveying pump 18 chargeable by the precompressed settled sludge, a pipe line 20 leading to the fluidized bed furnace 14 as well as two injection nozzles 22 and 24 arranged in the pipe line 20. The injection nozzles 22, 24 are supplied by dosing pumps 48 and 50 with a lubricant. The pressure monitoring of the system occurs through the use of manometers 28 and 30, which are arranged in the vicinity of the injection nozzles 22, 24. The pipe line 20 has several tube turns 60 of 90° or 45° and opens at its exit end through a lance 26 into the fluidized bed furnace 14.

The conveyor pipe 20 is composed of several pipe sections 20', 20" having an inside diameter $D_1$, which are joined with one another by pipe flanges 62. The pipe flanges 62 are constructed as flange rings, which are joined with the appertaining pipe sections 20', 20" by weld seams 64. The flange rings 62 engage one another in pairs with their facing surfaces in closed linkage and are axially pressed against one another by means of a clamping ring 66.

Figure 2:
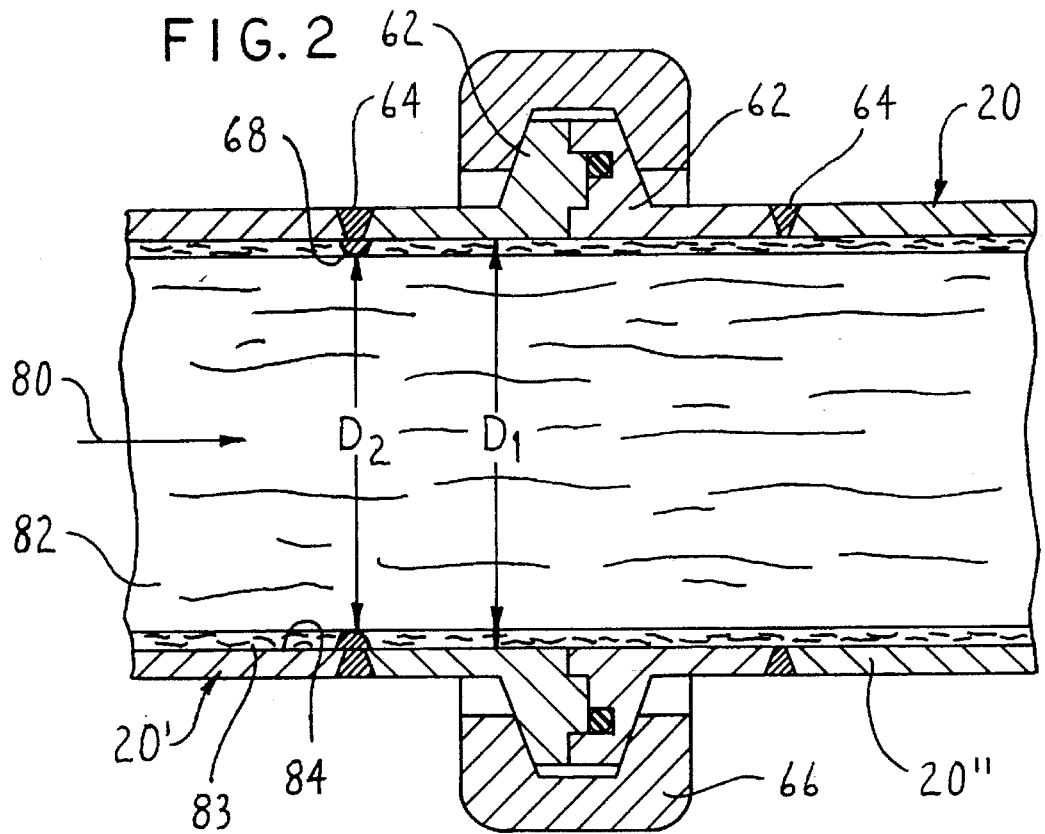
FIG. 2 shows a sectioned longitudinal section through a conveyance pipe having a protruding interior weld bead.

In the exemplary embodiment shown in FIG. 2, the annular weld seam 64 protrudes with an inside weld bead 68 by about 1 to 2 mm from the inside wall of the pipe 20 toward the pipe interior and forms in this manner a cross section constriction having an inside diameter $D_2$.

Figure 3:
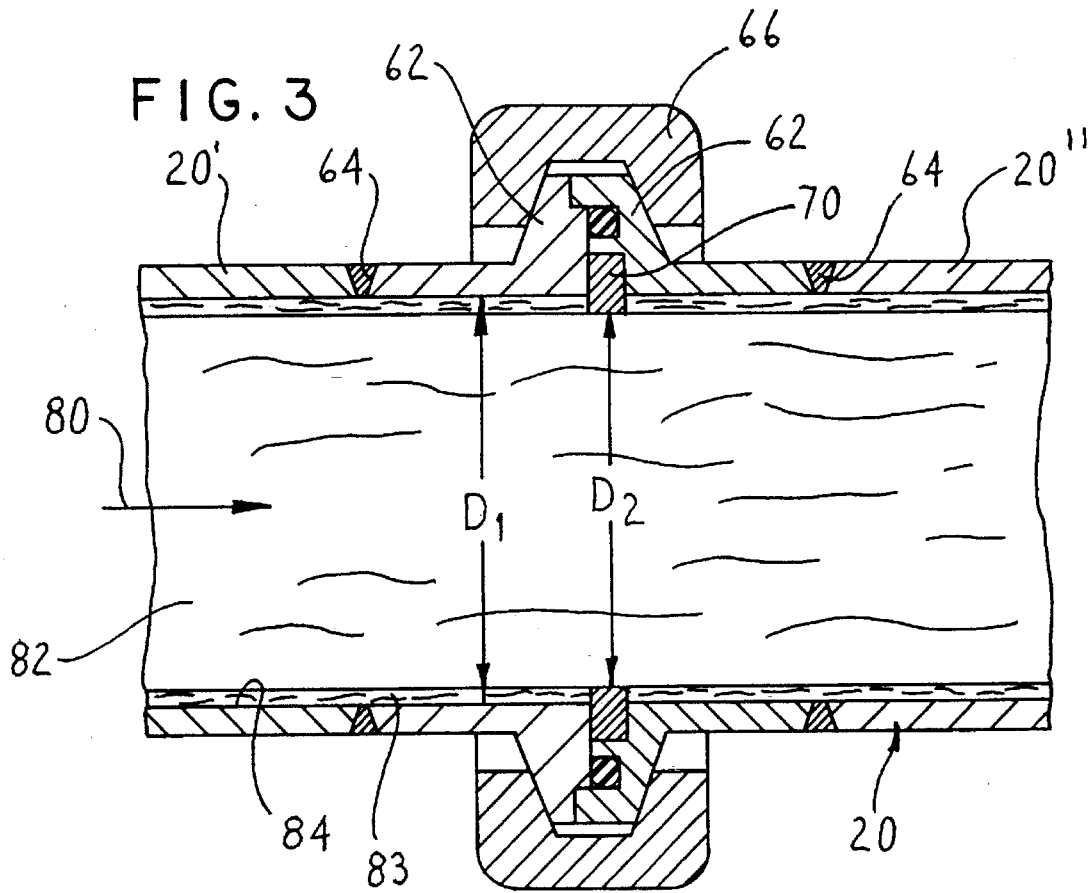
FIG. 3 shows a sectioned longitudinal section through the conveyance pipe having a collar ring.

In the exemplary embodiment according to FIG. 3, between the two flange rings 62 there is clamped a collar ring 70 which has an inside diameter $D_2$ smaller by 1 to 2 mm than the adjacent pipe sections 20', 20" and forms in this manner the desired cross section constriction.

Figure 4:
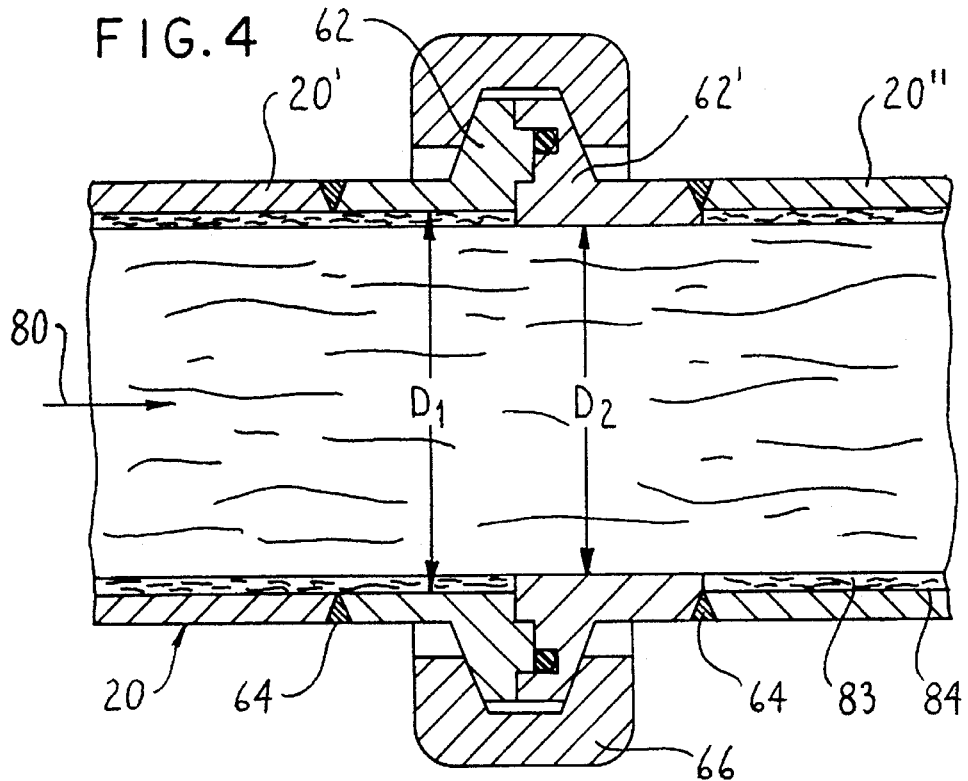
FIG. 4 shows a sectioned longitudinal section through a conveyance pipe having an inward-protruding flange ring.
Figure 5:
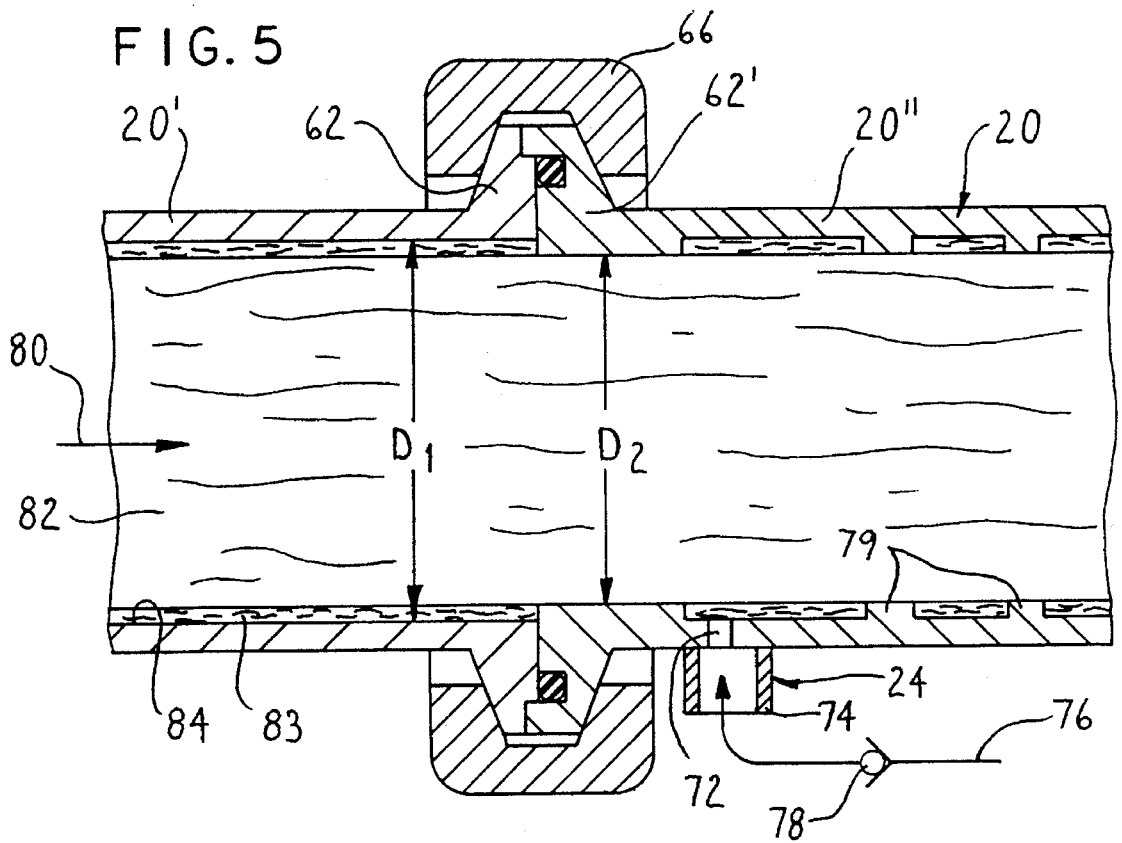
FIG. 5 shows a sectioned longitudinal section through a conveyance pipe having a protruding flange ring and injection bore.

In the exemplary embodiments according to FIGS. 4 and 5, one of the two flange rings 62 has a smaller inside diameter $D_2$ than the adjacent pipe sections 20', 20" and forms the cross section constriction in this manner. In the exemplary embodiment shown in FIG. 5, downstream of the flange ring 62' forming the cross section constriction, there is arranged an injection bore 72 extending transversely through the pipe wall and to which a connecting piece 74 is connected to a lubricant injection line 76 having nonreturn valve 78. In the case of horizontal or oblique alignment of the conveyor pipe 20, the injection bore 72 should be arranged on the underside of the conveyor pipe. Expediently also after each bend 60 in the tube there is provided a pipe section having an injection bore 72. In the further course of the pipe line 20 there are located still further cross section constrictions in the form of annular raised parts 79 which have a spacing of about 2 to 3 m from one another and which are formed in the above-described manner by inward protruding weld seams or weld rings.

Through the conveyor pipe 20 there is conveyed a cohesive thick substance plug flow 82 in the direction of the arrow 80 (FIGS. 2 to 5). The plug flow 82 in the zone of the cross section constrictions 68, 70, 62, 79 is radially inwardly compressed and is centered within the conveyor pipe 20 in such a way that between its surface and the inside of the pipe wall there remains an annular gap 84 filled with lubricant 83. The lubricant is injected into the conveyor pipe at the injection points 22, 24 The cross section constrictions 68, 70 62', 79 serve, in addition, the function of boundary layer barriers which provide that in the annular gaps 84 there is always sufficient lubricant 83 which is carried along only to a slight degree by the moved plug flow strand 82.

To sum up, the following is to be stated: The invention relates to a conveyance installation for thick substances rich in solids, with a conveyor pipe 20 which is filled with the thick substances under pressure, and at least one injection point 22, 24 opening into the conveyor pipe 20 for the introduction of a lubricant 83 into the region 84 between the pipe wall and the surface of a thick substance plug flow 82 that is formed in the conveyor pipe 20. In order to center the plug flow 82 inside the conveyor pipe 20 in its direction of movement and to generate a stable lubricant layer 83, it is proposed according to the invention that the conveyor pipe 20 will have at least one annular cross section constriction arranged downstream at a distance from the injection point 22, 24, which constriction is formed by a bulge or collar-type raised part arranged on the inside of the conveyor pipe 20. In the downstream part of the cross section constriction 62' there can be provided a bore 72 radially penetrating the pipe wall for the connection of an injection line 76 for lubricant, there being arranged at least one further cross section constriction 79 downstream at a distance from the injection bore 72.

Figure 6:
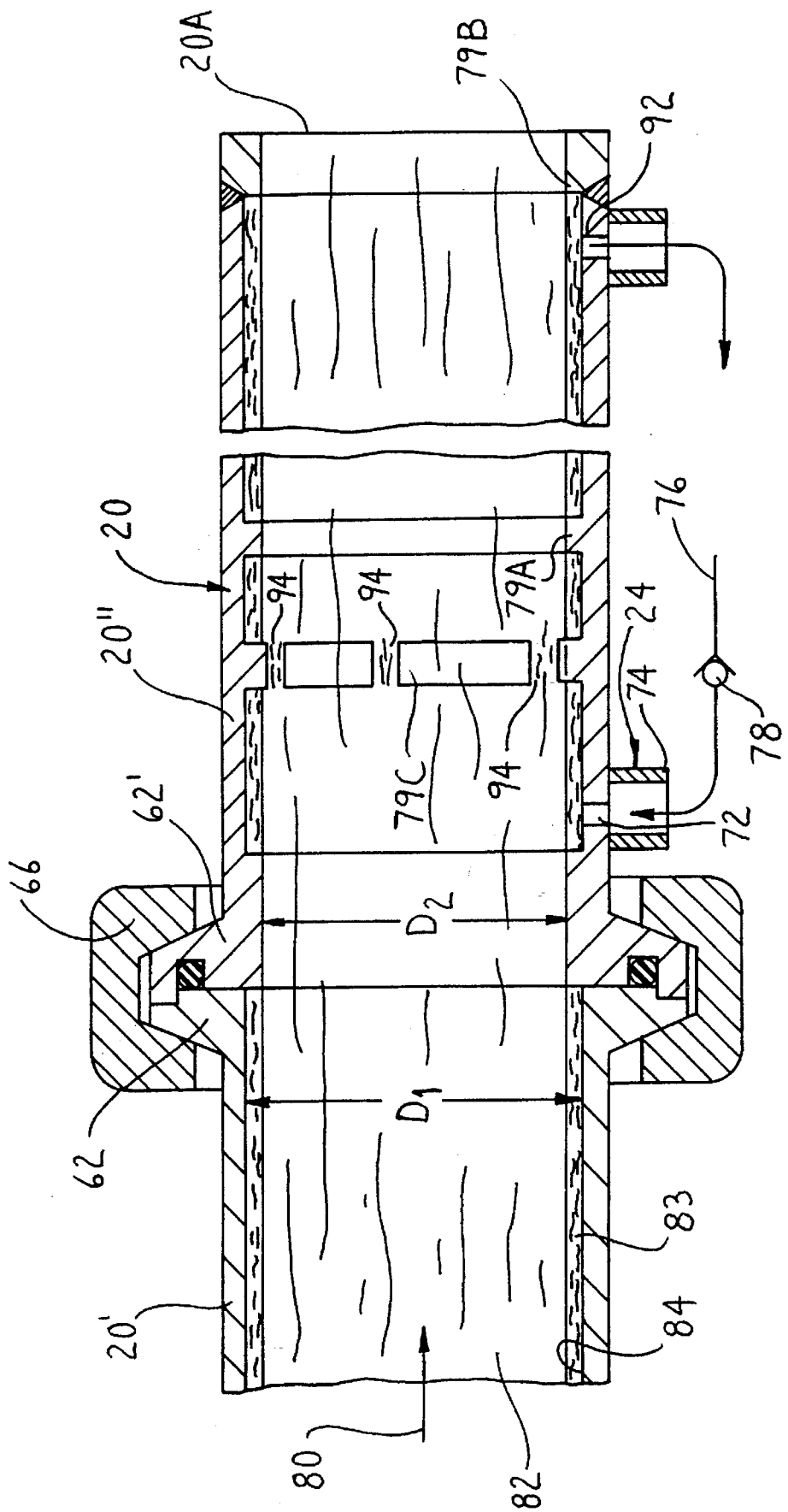
FIG. 6 shows a sectioned longitudinal section adjacent the end of the pipe wherein there is a draw-off bore through which the lubricant is drained from the pipe.

FIG. 6 illustrates how it is possible to recover the lubricant at the end 20A of the pipe 20. Here there are two cross section constrictions 79A and 79B that are spaced apart from each other. In the space between the constrictions 79A and 79B there is at least one drainage or draw-off bore 92 for the lubricant passing through the pipe. The recovered lubricant can be reused in the system.

FIG. 6 further illustrates how a cross section constriction, construction 79C, can be formed to define at least one break through 94 through which the lubricant can flow adjacent the inside wall of the pipe 20 in a direction parallel to the movement of the plug flow.

What is claimed is:

1. In a device for the conveyance of thick substances rich in solid material through a conveyor pipe having an inner wall that defines a pipe interior filled with a thick substance plug flow under pressure and having at least one injection point opening into the conveyor pipe for introducing a lubricant into a region between the inner wall of the pipe and the surface of a plug flow that is formed in the conveyor pipe and is transported therealong, the improvement wherein the conveyor pipe has at least one annular cross section constriction located downstream a distance from the injection point wherein the cross section constriction extends inwardly from the inner wall of the conveying pipe to block the flow of the lubricant.

2. The device according to claim 1, wherein the conveyor pipe in the region of the cross section constriction has an inside diameter 1 to 3 mm less than the adjacent diameter of the inner wall of the conveying pipe.

3. The device according to claim 2, wherein the conveyor pipe in the region of the cross section constriction has an inside diameter approximately 2 mm less than the adjacent diameter of the inner wall of the conveying pipe.

4. The device according to claim 1, wherein the cross section constriction is formed by an annular raised part arranged on the inside of the conveyor pipe.

5. The device according to claim 4, wherein the raised part forming the cross section constriction is provided with at least one break-through continuous in the flow direction of the plug flow.

6. The device according to claim 4, wherein the annual raised part consists of a wearproof member that is replaceable.

7. The device according to claim 1, wherein the cross section constriction is formed by an annular weld bead protruding into the pipe interior.

8. The device according to claim 1, wherein the cross section constriction is formed by a collar ring protruding into the pipe interior.

9. The device according to claim 8, wherein the collar-ring extending into the pipe interior is clamped between two pipe connecting flanges.

10. The device according to claim 1, wherein the cross section constriction is formed by a flange ring protruding into the pipe interior.

11. The device according to claim 10, wherein the flange ring protruding into the pipe interior is welded to a section of the conveying pipe.

12. The device according to claim 1, wherein the conveying pipe is formed with a curve downstream of the injection point and the cross section constriction is located downstream of the curve in the pipe.

13. The device according to claim 1, wherein downstream of the cross section constriction there is arranged a selectively closable bore formed in the conveying pipe to which an injection line for lubricants is connected.

14. The device according to claim 13, wherein downstream at a distance from the bore to which the injection line is connected there is arranged at least one additional cross section constriction.

15. The device according to claim 13, wherein the conveyor pipe is horizontally or diagonally oriented and the bore to which the injection line is connected is located in an underside section of the pipe.

16. The device according to claim 13, wherein the injection line includes a nonreturn valve that prevents reverse lubricant flow through the injection line.

17. The device according to claim 1, wherein along the conveyor pipe there are arranged cross section constrictions spaced 2 to 6 m from one another.

18. The device according to claim 1, wherein there are arranged, spaced from one another, at least two cross section constrictions, and wherein in a space between these cross section constrictions there is arranged at least one drainage bore penetrating the pipe.

\* \* \* \* \*